(12) United States Patent
Rahman et al.

(10) Patent No.: US 10,422,645 B2
(45) Date of Patent: Sep. 24, 2019

(54) ELECTRONIC APPARATUS PROVIDING INDOOR NAVIGATION AND METHOD THEREOF

(71) Applicant: Samsung Electronics Co., Ltd., Suwon-si, Gyeonggi-do (KR)

(72) Inventors: Muhammad Mahbubur Rahman, Dacca (BD); A. K. M. Mubashwir Alam, Gaibandha (BD); Sadre-Ala Parvez, Faridpur (BD); Abul Basher, Sehora Mymensingh (BD); Abusayeed Alam, Mymensingh (BD); Mohammad Tawhidul Islam Chowdhury, Dacca (BD); Mohammad Anwarul Hoque, Dacca (BD); Sardar Muhammad Monzurur Rahman, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 15/475,823

(22) Filed: Mar. 31, 2017

(65) Prior Publication Data

US 2017/0336210 A1   Nov. 23, 2017

(30) Foreign Application Priority Data

May 18, 2016 (KR) ........................ 10-2016-0061065

(51) Int. Cl.
*G01C 21/20* (2006.01)
*H04W 4/04* (2009.01)
*G01S 11/06* (2006.01)
*G01S 5/14* (2006.01)
*G01S 15/08* (2006.01)

(52) U.S. Cl.
CPC ............ *G01C 21/206* (2013.01); *G01S 11/06* (2013.01); *H04W 4/04* (2013.01); *G01S 5/14* (2013.01); *G01S 15/08* (2013.01)

(58) Field of Classification Search
CPC ......... G01C 21/206; G01S 11/06; H04W 4/04
See application file for complete search history.

(56) References Cited

U.S. PATENT DOCUMENTS 8,706,414 B2   4/2014  Funk et al.
9,964,409 B1*  5/2018  Flint .................... G01C 21/206
(Continued)

FOREIGN PATENT DOCUMENTS

CN      101144722 A     3/2008
WO      2008/036325 A2  3/2008

OTHER PUBLICATIONS

Golledge et al.; A geographical information system for a GPS based personal guidance system; Int. J. Geographical Information Science; vol. 12, No. 7; 727-749; 1998.
(Continued)

*Primary Examiner* — Anne M Antonucci
*Assistant Examiner* — Renee LaRose
(74) *Attorney, Agent, or Firm* — Jefferson IP Law, LLP

(57) ABSTRACT

An electronic apparatus for indoor positioning navigation, a method thereof, and a system thereof are provided. The electronic apparatus includes a transceiver for receiving near field wireless signals, a sensor for detecting motion of the electronic apparatus, a display, and at least one processor configured to determine if building map data of a building is received through the transceiver, generate a navigations map according to a type of the received building map data when the building map data is received, and control the display to display, a map matching a position of the electronic apparatus to a position of a destination of the electronic apparatus on the generated navigation map, by using one among intensity information of the wireless signals received through the transceiver and the motion information of the electronic apparatus detected through the sensor.

19 Claims, 14 Drawing Sheets

(56) References Cited

U.S. PATENT DOCUMENTS

| | | |
|---|---|---|
| 2007/0150195 A1 | 6/2007 | Koskan et al. |
| 2008/0042829 A1 | 2/2008 | Christopher |
| 2008/0082258 A1 | 4/2008 | Pham et al. |
| 2010/0177659 A1 | 7/2010 | Hethuin et al. |
| 2011/0267179 A1 | 11/2011 | Patterson |
| 2014/0084050 A1 | 3/2014 | Calvarese et al. |
| 2014/0195149 A1 | 7/2014 | Yang et al. |
| 2014/0368382 A1* | 12/2014 | Vartanian ............... G01S 15/08 342/357.55 |
| 2014/0370917 A1 | 12/2014 | Buchheim et al. |
| 2015/0296476 A1 | 10/2015 | Wilmhoff et al. |

OTHER PUBLICATIONS

Hightower et al.; Particle Filters for Location Estimation in Ubiquitous Computing: A Case Study; Sep. 2004; Seattle, WA.

Woodman et al.; Pedestrian Localisation for Indoor Environments; UbiComp '08: Proceedings of the 10th International conference on Ubiquitous computing; ACM, 2008; pp. 114-123; New York, NY.

Storms et al; Magnetic Field Aided Indoor Navigation; Proceedings of the 13th European Navigation Conference GNSS; Department of the Air Force Air University Air Force Institute of Technology; 2009; Wright-Patterson Air Force Base, Ohio.

Haverinen et al.; Global indoor self-localization based on the ambient magnetic field; Robotics and Autonomous Systems; Robotics and Autonomous Systems 57; Jul. 26, 2009.

\* cited by examiner

ELECTRONIC APPARATUS PROVIDING INDOOR NAVIGATION AND METHOD THEREOF

CROSS-REFERENCE TO RELATED APPLICATION(S)

This application claims the benefit under 35 U.S.C. § 119(a) of a Korean patent application filed on May 18, 2016 in the Korean Intellectual Property Office and assigned Serial number 10-2016-0061065, the entire disclosure of which is hereby incorporated by reference.

TECHNICAL FIELD

The present disclosure relates to an indoor positioning system (IPS). More particularly, the present disclosure relates to an electronic apparatus configured to minimize errors of distance measurement by using near field wireless signals, and generate and provide different navigation maps according to user moving information and indoor map data, and a method thereof.

BACKGROUND

Large shopping malls and high-rise buildings have proliferated, and it is becoming more difficult for people to find desired places and desired items in an indoor space. Generally, in an outdoor space, one's position can easily be confirmed by using the global positioning system (GPS). However, GPS signals may not be received in an indoor space in many instances.

Development of technology using Bluetooth low energy (BLE) as an indoor positioning system (IPS) is being widely expanded. The BLE based IPS is an indoor positioning system based on a user terminal which does not require an external server.

Triangulation and fingerprinting techniques according to the related art are used with IPS, using a received signal strength indicator (RSSI) value of near field wireless signals such as BLE signals, for measuring a distance to a position of a terminal such as smart phone. However, measuring a distance through the triangulation and fingerprinting techniques still require technological development that can reduce errors in measurements.

Wireless signals such as Bluetooth (BT), near field communication (NFC) and radio frequency identification (RFID) may fluctuate in signal strength according to the indoor environment of a building (e.g., presence of inner walls of a building, a number of people moving therein, etc.).

Further, when the indoor navigation according to the related art is provided based on the near field wireless signals, if a floor plan of a place the terminal is positioned is obtained through a building map database, a navigation map may be generated.

Accordingly, when measuring a distance in an indoor environment, a new technology to minimize errors of the measured distance is necessary. Further, a new technology is necessary, in which an intuitive navigation map is provided to a user, even without a building floor plan, by using different map data presented in the building map database of an indoor environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus which determines user position more accurately by using different distance measurement algorithms by multi-steps according to a received signal strength indicator (RSSI) value of near field wireless signals, and generates and provides an optimized navigation map to a user according to user moving information and map data types, and a method thereof.

In accordance with an aspect of the present disclosure, an electronic apparatus for indoor positioning navigation is provided. The electronic apparatus includes a transceiver configured to receive near field wireless signals, a sensor configured to detect motion of the electronic apparatus, a display, and a processor configured to determine if building map data of a building is received through the transceiver, generate a navigation map according to a type of the received building map data when the building map data is received, and control the display to display a map matching a position of the electronic apparatus to a position of a destination of the electronic apparatus on the generated navigation map, by using at least one among intensity information of the wireless signals received through the transceiver and motion information of the electronic apparatus detected through the sensor.

In accordance with another aspect of the present disclosure, a method for indoor positioning navigation of an electronic apparatus is provided. The method includes receiving near field wireless signals, determining if building map data of a building is received, detecting motion of the electronic apparatus, generating a navigation map according to a type of the received building map data when building map data is received, and displaying a map matching a position of the electronic apparatus to a position of a destination of the electronic apparatus on the generated navigation map, by using at least one among intensity information of the received wireless signals and motion information of the detected motion of the electronic apparatus.

In accordance with another aspect of the present disclosure, a non-transitory computer-readable recording medium having recorded thereon a program executable by a computer for performing a method of operating an electronic apparatus is provided. The method includes receiving near field wireless signals, determining if building map data of a building is received, detecting motion of the electronic apparatus, generating a navigation map according to a type of the received building map data when building map data is received, and displaying a map matching a position of the electronic apparatus to a position of a destination of the electronic apparatus on the generated navigation map, by using at least one among intensity information of the received wireless signals and motion information of the detected motion of the electronic apparatus.

The electronic apparatus and the indoor navigation method according to an embodiment may implement a system that can provide user terminal based-indoor positioning without using an external server, measure user position more accurately, and provide a more intuitive navigation map to a user.

Further, based on data information on a user moving within an indoor space, the building used by a user can build more accurate user-based building information database. Accordingly, a building can provide optimized information for users based on information data of users.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
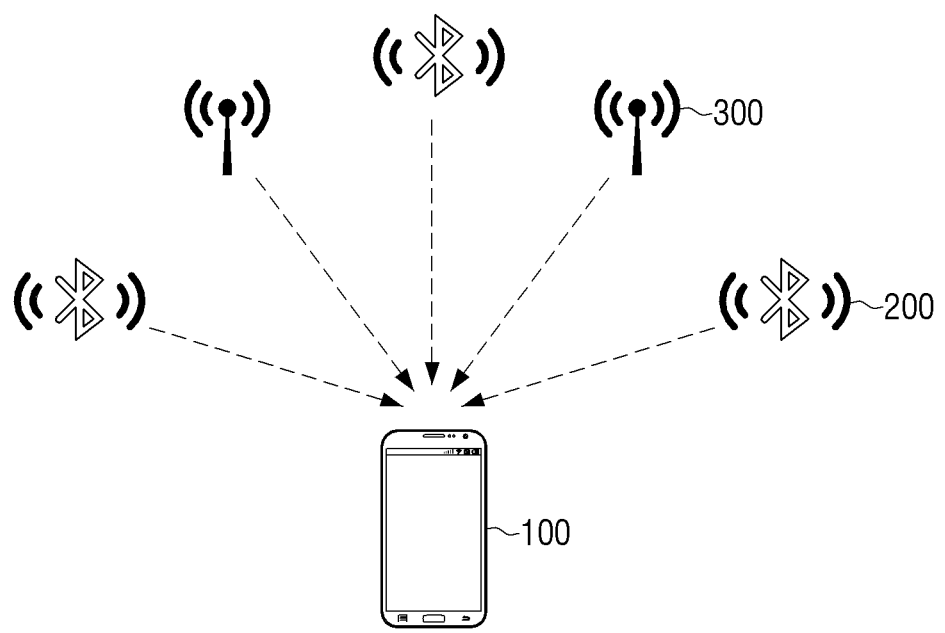
FIG. 1 is a diagram illustrating an indoor positioning system using near field wireless communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms such as 'first,' and so on may be used in explaining various elements, but the elements may not be limited by the terms. Terms are used only for distinguishing one element from another.

In the present disclosure, terms such as "comprise" or "consist" may designate presence of features, numbers, operations, elements, parts, or a combination thereof disclosed in the specification, and these terms should not be construed as precluding presence or adding possibility of one or more other features, numbers, operations, elements, parts, or a combination thereof.

In the present disclosure, "module" or "unit" may perform at least one function or operation, and may be implemented by hardware, software or a combination thereof. Further, a plurality of "modules" or a plurality of "units" may be implemented to be at least one processor (not illustrated) by being integrated to be at least one module except for the "modules" or "units" that are necessary to be implemented to be specific hardware.

By referring to attached drawings, following will specifically explain an embodiment of the present disclosure that can be easily implemented by one of ordinary skill in the art. However, the present disclosure may be implemented to be different forms, and may not be limited to embodiments described below. Further, drawings skip description of irrelevant part for clarity of the present disclosure, and similar drawing reference numerals are referred to similar parts throughout the specification.

FIG. 1 is a diagram illustrating an indoor positioning system using near field wireless communication according to an embodiment of the present disclosure.

Referring to FIG. 1, the indoor positioning system 10 may include an electronic apparatus 100, a plurality of wireless signal sources 200 which transmit near field wireless signals, and wireless networks 300.

According to an embodiment of the present disclosure, the indoor positioning system 10 may be implemented in an indoor space where the electronic apparatus 100 may not receive global positioning system (GPS) signals. For example, an indoor space may be a shopping mall, a hospital, an airport, a large building, a university, and so on. The indoor positioning system may include an outdoor space of a building which includes a building structure. For example, an outdoor space of a building may include a parking lot of a building or an outdoor garden of a building.

The electronic apparatus 100 may include a display, and may be a mobile communication device which receives near field wireless signals and wireless network signals. For example, the electronic apparatus 100 may be a smart phone, a tablet computer, a net book, a notebook, a laptop, a palmtop, a head mounted display (HMD), and so on. The above examples are provided for explanation of the present disclosure, and the present disclosure is not limited thereto. The electronic apparatus 100 may include a communication module performing near field wireless communication such as Bluetooth (BT) or Bluetooth low energy (BLE).

The present disclosure relates to an indoor positioning system using the wireless signal source 200, which transmits near field wireless signals such as BT and BLE, and the electronic apparatus 100. However, the present disclosure may be expanded and applied to the wireless network communication such as Wi-Fi.

The wireless signal sources 200 may include near field communication (NFC), radio frequency identification (RFID), BT, BLE, and so on which support the near field wireless communication. The wireless signal sources 200 may include RFID tag. For example, the wireless signal sources 200 may be implemented to be a BLE beacon. The wireless signal sources 200 may transmit near field wireless signals having unique identification (ID) in an indoor space.

The electronic apparatus 100 may have a received signal strength indicator (RSSI) value from the near field wireless signals received from the wireless signal sources 200. The electronic apparatus 100 may determine distance and position between the wireless signal source 200 and the electronic apparatus 100 based on RSSI value. Further, the electronic apparatus 100 may generate a navigation map based on the determined distance and position. A method for determining position based on RSSI and a method for generating a navigation map with the electronic apparatus 100 will be described below.

Figure 2:
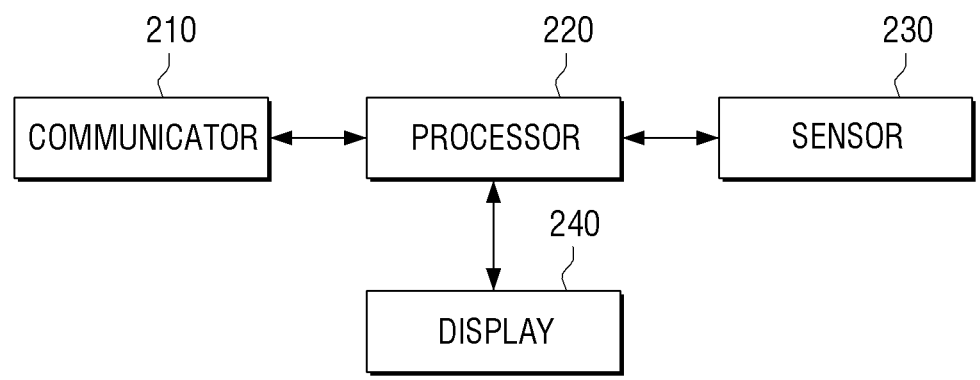
FIG. 2 is a block diagram briefly illustrating constitution of an electronic apparatus according to an embodiment of the present disclosure.

FIG. 2 is a block diagram briefly illustrating constitution of the electronic apparatus according to an embodiment of the present disclosure.

Referring to FIG. 2, the electronic apparatus 100 may include a communicator 210 (e.g., a transceiver), a processor 220 (e.g., at least one processor), a sensor 230 and a display 240.

The communicator 210 may include near field wireless communication module such as BLE and BT. The communicator 210 may receive wireless signals from the wireless signal sources 200 illustrated in FIG. 1 which are compliant with BLE. The communicator 210 may receive data externally through the wireless network interface and the near field wireless communication module.

The communicator 210 may receive building map data of an indoor space where the electronic apparatus 100 is positioned through the near field wireless communication.

For example, the communicator 210 may externally receive building map data of an indoor space where the electronic apparatus 100 is positioned through the near field wireless communication such as BT, NFC, etc. Further, the communicator 210 may receive a building map (e.g., building indoor map) where the electronic apparatus 100 is positioned through the wireless network such as Wi-Fi.

The building map data may include at least one of building features and landmarks such as building indoor corridors, stairways, and elevators, respective floor plans of floors of a building, partial floor plans, and tracking data of users using a building indoor space. The above is one of the embodiments of the present disclosure and the present disclosure is not limited thereto. For instance, the building map data may include various information related with the building indoor information.

The sensor 230 may include a plurality of sensors that can detect motion of the electronic apparatus 100. For example, the sensor 230 may detect step size, step speed, and running detection of a user using the electronic apparatus 100. The sensor 230 may include various sensors such as motion sensor, gyroscope sensor, acceleration sensor, barometer, thermal sensor, humidity sensor and ultrasound sensor. However, the above is one of the embodiments of the present disclosure, and the present disclosure is not limited thereto.

The display 240 may include a touch display.

The display 240 may display a point occupied by the electronic apparatus 100 in an indoor space. The display 240 may display a navigation map generated in the electronic apparatus 100. The display 240 may display user interface to implement various functions according to an embodiment of the present disclosure. The display 240 may display a two-dimensional (2D) navigation map, a three-dimensional (3D) navigation map and a virtual reality navigation map.

Although the present disclosure mainly discloses features of displaying a navigation map, the electronic apparatus 100 may be implemented to guide navigation for a user toward a destination desired by a user through audio voices. Further, the electronic apparatus 100 may be implemented to provide various user interface functions of a normal GPS navigation, such as distance to a destination and expected travel time.

The processor 220 may determine whether building map data is received through the communicator 210. Further, the processor 220 may generate different forms of navigation maps according to a type of the received building map data when building map data is received through the communicator 210.

In an example, the building map data may be obtained from a building database in an indoor space where the electronic apparatus 100 is positioned through the near field wireless communication such as NFC, BT, and BLE.

The processor 220 may control the display 240 to display map matching from position of the electronic apparatus 100 to position of a destination of the electronic apparatus 100 on the generated navigation map by using at least one among the intensity information of the wireless signals received through the communicator 210 and the motion information of the electronic apparatus 100 detected through the sensor 230.

According to an embodiment of the present disclosure, a destination of the electronic apparatus 100 may be a place selected by a user using the electronic apparatus 100 through the user interface, or a point occupied by a target item selected by a user.

The processor 220 may be provided with information regarding an object attached with an RFID tag. The wireless communication with an RFID tag is well-known to an ordinary person skilled in the art, and therefore, specific explanation thereof will be not provided below.

When ultrasound data is available for use in an indoor space, the processor 220 may determine the position of the electronic apparatus 100 on the navigation map by determining a distance between the electronic apparatus 100 and the wireless signal source of an indoor space based on response time of the ultrasound data detected through an ultrasound sensor.

When ultrasound data is not available for use in an indoor space, the processor 220 may determine the position of the electronic apparatus 100 on the navigation map by determining a distance between the electronic apparatus 100 and the wireless signal sources based on the received RSSI values of BLE wireless signals from the indoor wireless signal sources through BLE wireless signal communication module in an indoor space.

The processor 220 may determine one of a plurality of distance measurement algorithms in order to measure a distance between the electronic apparatus 100 and the wireless signal sources 200 of FIG. 1 according to a RSSI value. Further, the processor 220 may determine a distance between the electronic apparatus and the wireless signal sources 200 from the received RSSI value by using the determined distance measurement algorithm.

A method for generating various navigation maps according to an embodiment of the present disclosure will be described below with reference to FIGS. 4 to 8, and a method for applying the multi-step distance measurement algorithm according to a RSSI value will be described below with reference to FIGS. 3A and 3B.

Figure 3A:
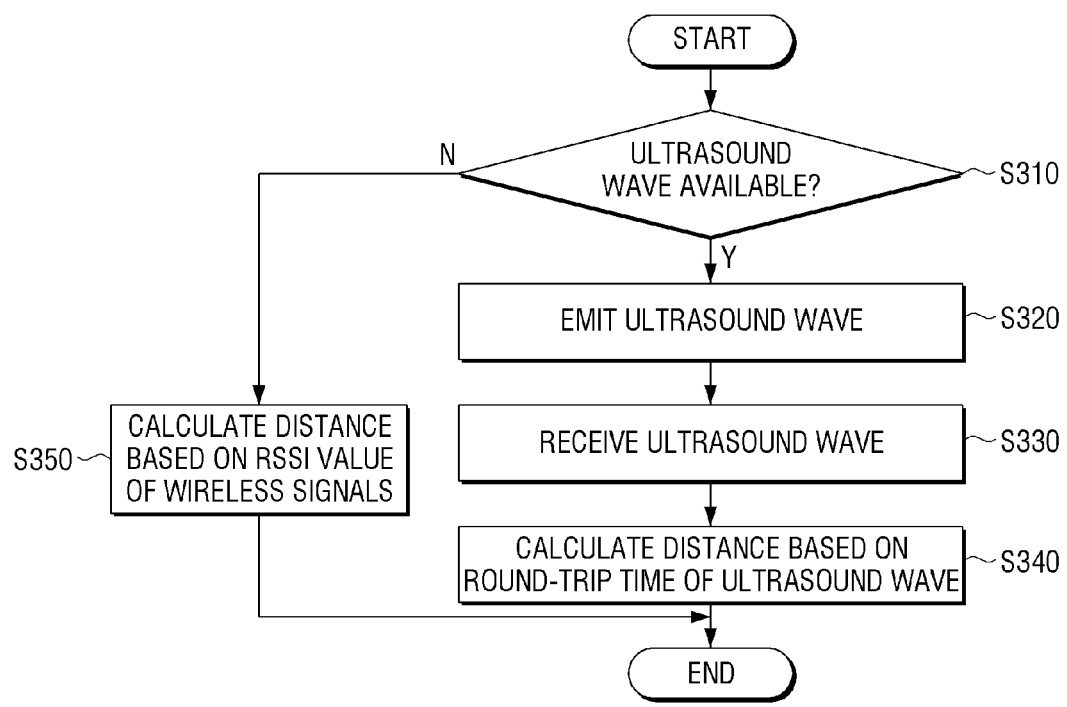
FIGS. 3A and 3B are flowcharts provided to explain a method for measuring a distance by using ultrasound and near field wireless signals according to various embodiments of the present disclosure.
Figure 3B:
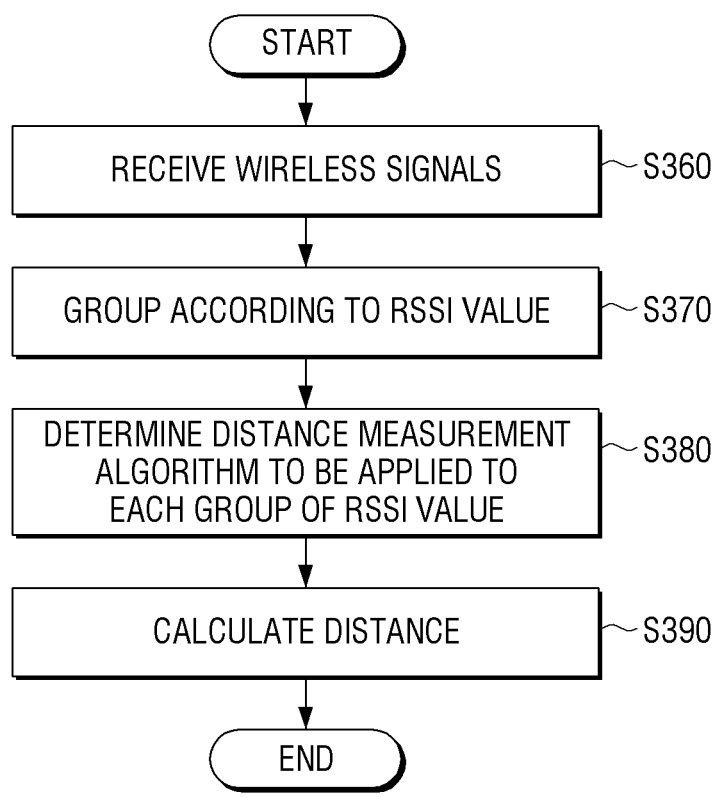

FIGS. 3A and 3B are flowcharts provided to explain a method for measuring a distance by using the ultrasound signals and the near field wireless signals according to an embodiment of the present disclosure.

FIG. 3A is a flowchart provided to explain a method for measuring a distance between the electronic apparatus and the wireless signal sources according to possibility of using ultrasound data in an indoor space.

Referring to FIG. 3A, the electronic apparatus 100 may determine whether ultrasound data can be used in an indoor space, at operation S310. For example, when the ultrasound sensor is included in the electronic apparatus 100 and indoor devices, the electronic apparatus 100 may use ultrasound data in an indoor space. When it is determined that ultrasound data is available for use in an indoor space, at operation S310, the electronic apparatus 100 may emit ultrasound wave externally through a transmitter of the ultrasound sensor, at operation S320. The electronic apparatus 100 may receive a carrier wave of the ultrasound wave emitted with the receiver of the ultrasound sensor, at operation S330. The electronic apparatus 100 may determine emit/receive round-trip time of the ultrasound wave, and calculate a distance from the external device transmitting the carrier wave to the electronic apparatus 100 based on the calculated time, at operation S340. A distance d may be obtained by multiplying a velocity v and a time t. When it is determined that ultrasound data is not available for use in an indoor space, at operation S310, the electronic apparatus 100 may calculate a distance between the wireless signal sources and the electronic apparatus 100 based on the RSSI value of the near field wireless signal in an indoor space, at operation S350.

Based on the calculated distance according to the above embodiment of the present disclosure, the electronic apparatus 100 may determine the position of the electronic apparatus 100 in an indoor space. Further, a navigation map may be generated based on the determined position of the electronic apparatus 100.

FIG. 3B is a flowchart provided to explain a method for measuring a multi-step distance according to a RSSI value of the near field wireless signals.

The method for measuring a distance from RSSI values of the wireless devices is one of well-known methods in the indoor positioning and indoor navigation technologies.

In this present disclosure, without using the triangulation used in a related distance measuring method with RSSI value, multi sections may be divided according to a RSSI value, and a proper distance measurement algorithm that can reduce errors per multi sections may be applied.

According to an embodiment of the present disclosure, the electronic apparatus 100 may include a BT communication module which receives BLE signals from a plurality of the wireless signal sources.

At operation S360, when the electronic apparatus 100 is in a BT activated state, and when a user using the electronic apparatus 100 enters an indoor space where BLE communication is available, the electronic apparatus 100 may have a RSSI value by receiving BLE signals from the wireless signal sources in the indoor space.

At operation S370, the electronic apparatus 100 may group distances according to a RSSI value. For example, when a RSSI value is greater than a first value, a distance may be determined to be a first distance. When a RSSI value is less than a second value, a distance may be determined to be a second distance. When a RSSI value is between the first value and the second value, a distance may be determined to be between the first distance and the second distance.

In an example, because a RSSI value may be changed by influences from various elements of an indoor environment where the electronic apparatus 100 is positioned, the electronic apparatus 100 may group distances according to RSSI values based on an average value of the received RSSI values per distance.

Accordingly, an average of RSSI values may be calculated according to environment feature of an indoor space by receiving various RSSI values according to a position and direction of the electronic apparatus 100, and position measurement may be performed more accurately based on the data as a result of statistically analyzing the calculated RSSI average values.

The RSSI database of an indoor space (e.g., inside a building) occupied by the electronic apparatus 100 may store a RSSI average value according to distances of various electronic apparatuses using an indoor space for data. Further, the RSSI database of an indoor space may provide information such as RSSI average value classification according to a distance of the electronic apparatus 100 to the electronic apparatus 100 through the near field wireless communication.

The electronic apparatus 100 may update the received RSSI value per distance at real time according to the movement of the electronic apparatus 100, and store the values in the database of the electronic apparatus 100.

At operation S380, the electronic apparatus 100 may determine a distance measurement algorithm having a least error according to a grouping of distances according to RSSI values. The electronic apparatus 100 may have optimized algorithm information according to a distance when it is manufactured. The electronic apparatus 100 may obtain optimized algorithm information according to a distance through database of an indoor (building) space occupied by the electronic apparatus 100. Determining an optimized algorithm may be implemented with a statistical method.

For example, when a RSSI value is greater than the first value, an error may be minimized in a first distance measurement algorithm. Further, when a RSSI value is less than the second value, an error may be minimized in a second distance measurement algorithm. When a RSSI value is between the first value and the second values, an error may be minimized in a third distance measurement algorithm.

For example, when a RSSI value is greater than the first value of −44 dBm, a distance may be measured with minimum error when using the first distance measurement algorithm of the linear approximation model (LAM). Further, when a RSSI value is between the second value of −53 dBm and the first value of −44 dBm, a distance may be measured with minimum error when using the second distance measurement algorithm of the free space Friis model (FSFM) algorithm. Further, when a RSSI value is less than the second value of −53 dBm, a distance may be measured with minimum error when using the third algorithm of the flat earth model (FEM) algorithm.

In another example, when a RSSI value is greater than or equal to the first value of −46 dBm, a distance may be measured with minimum error when using the first distance measurement algorithm of LAM. Further, when a RSSI value is less than the first value of −46 dBm, a distance may be measured with minimum error when using the second distance measurement algorithm of FSFM.

The classification and algorithms according to RSSI values described above are merely one of the various embodiments of the present disclosure for an explanation thereof, and the present disclosure is not limited thereto. For example, the electronic apparatus 100 may be implemented to measure a distance with small error by using various distance measurement algorithms from RSSI values.

At operation S390, the electronic apparatus 100 may calculate a distance by using the determined distance measurement algorithm.

In an example, the RSSI value may change unexpectedly, and the electronic apparatus 100 may be implemented through average algorithm and smoothing algorithm of RSSI values in order to reduce an error in the measurement of a distance. For example, the average algorithm may respectively classify the calculated RSSI values through the distance measurement algorithms used in the measurement of a distance according to an increase order, and calculate an average in each of the distance measurement algorithms with a medium value "m" among the classified values. The average algorithm and the smoothing algorithm are already published in the art, and thus a description thereof will not be provided herein.

Further, the above described distance measurement method may be applied to a system constituted with a plurality of inertial navigational devices. The principle of determining a distance based on RSSI in the inertia navigational device is already published in the art and thus a description thereof will not be provided herein.

Figure 4:
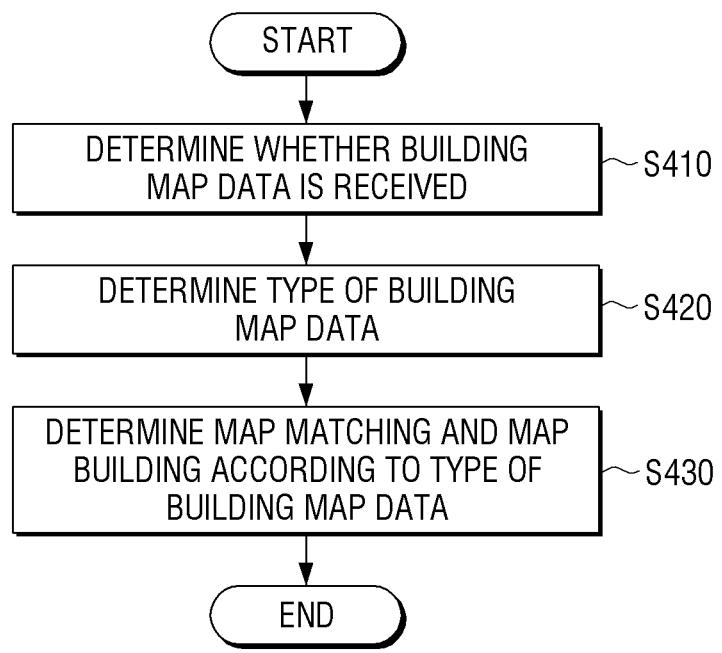
FIG. 4 is a flowchart provided to explain a method for generating a navigation map according to an embodiment of the present disclosure.

FIG. 4 is a flowchart provided to explain a method for generating a navigation map according to an embodiment of the present disclosure.

Referring to FIG. 4, the electronic apparatus 100 may receive building map data from the database of an indoor space where the electronic apparatus 100 is positioned through the near field wireless communication. For convenience of explanation with regard to FIG. 4, the processor 220 of the electronic apparatus 100 may be referred to as the electronic apparatus 100.

At operation S410, the electronic apparatus 100 (i.e. the processor 220) may determine whether or not building map data is received through the near field wireless communication.

The electronic apparatus 100 may generate different forms of navigation maps according to a type of the building map data when building map data is received through the near field wireless communication.

When the electronic apparatus 100 does not receive the building map data through the near field wireless communication, the electronic apparatus 100 may generate a navigation map by using movement information data of the electronic apparatus 100 detected through a sensor such as motion recognizer or motion sensor, and position information of the wireless signal sources 200 illustrated in FIG. 1. Further, the electronic apparatus 100 may download building maps from a web site through the wireless network and generate a navigation map on the downloaded map.

At operation S420, the electronic apparatus 100 may determine a type of the received building map data. The building map data may include at least one of building features and building landmark such as corridors, stairways, and elevators, respective floor plans of floors of a building, respective partial floor plans of floors of a building, and tracking data of users using a building indoor space.

At operation S430, the electronic apparatus 100 may generate a navigation map through at least one algorithm among map matching and map building according to the determined type of the building map data.

According to an embodiment of the present disclosure, the electronic apparatus 100 may generate a navigation map by using the floor plan when the received building map data includes a floor plan of a floor where the electronic apparatus 100 and a destination directed by the electronic apparatus 100 are positioned.

For example, when the electronic apparatus 100 is positioned on the first floor, a target item desired by a user using the electronic apparatus 100 is positioned on the first floor, and the building map data received by the electronic apparatus 100 includes a floor plan of the first floor, the electronic apparatus 100 may generate a navigation map on the floor plan of the first floor. For convenience of explanation, the above example may be named as "complete floor plan."

The electronic apparatus 100 may map-match and display a road from the electronic apparatus 100 to the target item by using the map matching algorithm on the generated navigation map. For the map matching algorithm, a published algorithm in the art may be used.

According to another embodiment of the present disclosure, the electronic apparatus 100 may generate the navigation map by generating the other floor plan of the partial floor plan with the utilization of a floor plan of adjacent floors, when the received building map data includes a partial floor plan of at least one floor among the floors occupied by the electronic apparatus 100 and a destination directed by the electronic apparatus 100 and includes floor plans of adjacent floors to the floor of the partial floor plan.

For example, the electronic apparatus 100 may be positioned on the first floor, a destination of the electronic apparatus 100 may be positioned on the second floor, and the received building map data may include a floor plan of the first floor and a partial floor plan of the second floor. The electronic apparatus 100 may generate a floor plan, with respect to a region which does not include floor plan information among the partial floor plans of the second floor, by using the map building algorithm based on the floor plan information of the first floor. The electronic apparatus 100 may generate a navigation map on the floor plan of the first floor and the newly generated floor plan of the second floor. An algorithm published in the art may be used or modified to be implemented as the map building algorithm. For convenience of explanation, the above example may be named as "partial floor plan."

The electronic apparatus 100 may display on the display map matching from the electronic apparatus 100 to a destination of the electronic apparatus 100 by using the map matching algorithm on the generated navigation map. An algorithm published in the art may be used or modified to be implemented as the map matching algorithm.

According to another embodiment of the present disclosure, when the received building map data includes partial floor plans of a floor occupied by the electronic apparatus 100 and a floor occupied by a destination of the electronic apparatus 100 and does not include floor plans of adjacent floors, a navigation map may be generated by generating a floor plan of the partial floor plan based on the data excluding the floor plan information among the building map data.

For example, the electronic apparatus 100 may be positioned on the first floor, a destination of the electronic apparatus 100 may be positioned on the third floor, and the received building map data includes partial floor plans of the first floor and the third floor while excluding floor plans of the second floor and the fourth floor. In an example, the electronic apparatus 100 may generate a navigation map by map building the floor plans of the partial floor plans based on position information of building features and building landmarks (e.g., stairways, elevators, fountains, and so on)

of the building map data. For convenience of explanation, the above example may be named as a "partial floor plan."

According to another embodiment of the present disclosure, when the received building map data does not include a floor plan of at least one floor among the floors occupied by the electronic apparatus 100 and a destination of the electronic apparatus 100, the electronic apparatus 100 may generate a navigation map including tracking outline information of a building based on the data excluding the floor plan information among the building map data with respect to the floors excluded with floor plans. For convenience of explanation, the above example may be named as a "no floor plan."

For example, when the received building map data does not include a floor plan and a partial floor plan of the first floor occupied by the electronic apparatus 100, the electronic apparatus 100 may map build the floor plan including outline based on position information of the building features and landmarks among the building map data of the first floor, and generate a navigation map including tracking information of users on the generated floor plan marked with outline by using the tracking information of users within a building indoor space.

The above embodiments are described by exemplifying a building constituted with a plurality of floors, however, an embodiment of the present disclosure may be applied to a building constituted with one floor. Further, the above description is one of the embodiments of the present disclosure for explanation thereof, and the present disclosure is not limited thereto.

FIGS. 5 to 8 are diagrams are provided to explain navigation maps generated according to building map data according to various embodiments of the present disclosure.

Figure 5:
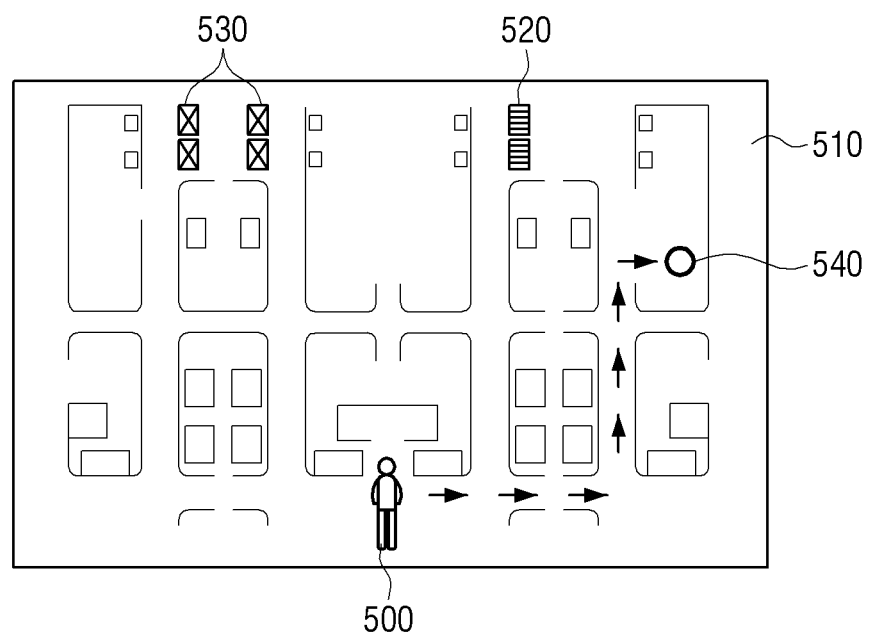
FIGS. 5, 6, 7, and 8 are diagrams provided to explain the navigation maps generated according to building map data according to various embodiments of the present disclosure.

FIG. 5 is a navigation map describing an example of the "complete floor plan" of FIG. 4.

Referring to FIG. 5, a user 500 using the electronic apparatus 100 (shown in FIG. 1) and a target destination 540 of a user may be positioned on the first floor. The building map data received by the electronic apparatus 100 may include a floor plan 510 of the first floor. The building map data may include position information of an elevator 530 and a stairway 520 which are features and landmarks of the first floor. The electronic apparatus 100 may generate a navigation map by using the floor plan 510, and display navigation information guiding a road to the target destination 540 for the user 500 by using the map matching algorithm, as illustrated in FIG. 5.

Figure 6:
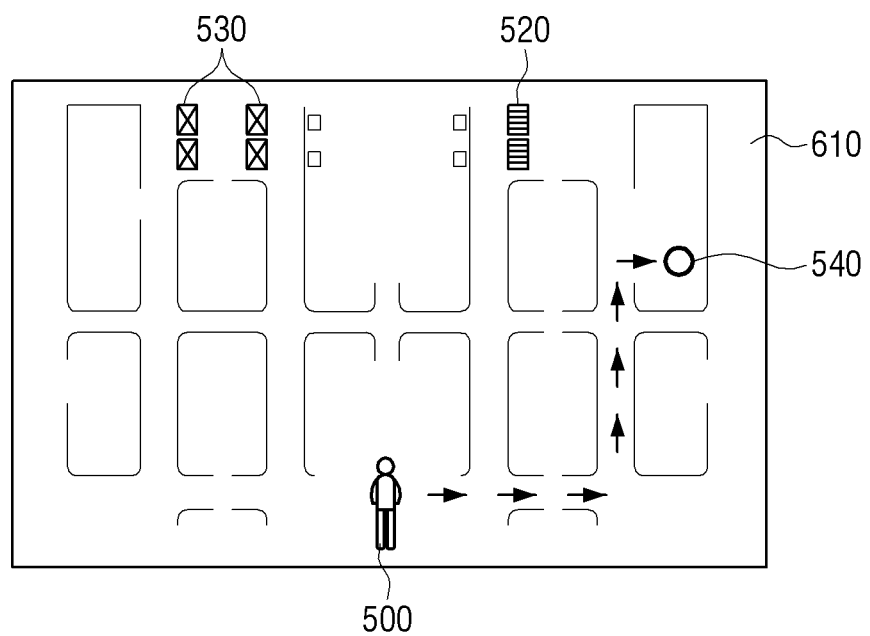

FIG. 6 is a navigation map describing an example of the "partial floor plan" of FIG. 4.

Referring to FIG. 6, the user 500 using the electronic apparatus 100 and the target destination 540 of the user may be positioned on the first floor. The building map data received by the electronic apparatus 100 may include a partial floor plan 610 of the first floor. The partial floor plan 610 may illustrate a part of the building structure of the first floor compared to the floor plan 510 of FIG. 5. The building map data may include position information of the elevator 530 and the stairway 520 which are features and landmarks of the first floor.

When a floor plan of a floor adjacent to the first floor is included in the building map data, the electronic apparatus 100 may map build an un-illustrated part with a part of the partial floor plan 610 based on the floor information of the adjacent floor.

When a floor plan of a floor adjacent to the first floor is not included in the building map data, the electronic apparatus 100 may map build the partial floor plan 610 based on the position information of the elevator 530 and the stairway 520 which are features and landmarks included in the building map data, generate a navigation map on the generated floor plan, and display navigation information guiding a road to the target destination 540 for the user 500 by using the map matching algorithm, as illustrated in FIG. 6.

Figure 7:
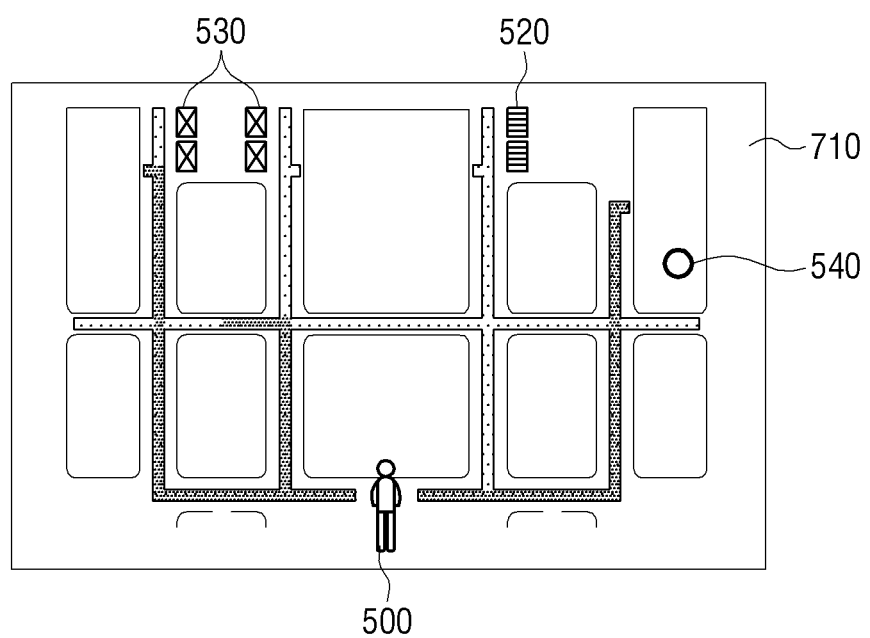

FIG. 7 is a navigation map describing an example of the "no floor plan" of FIG. 4.

Referring to FIG. 7, the user 500 using the electronic apparatus 100 and the target destination 540 of the user may be positioned on the first floor. The building map data received by the electronic apparatus 100 may not include a floor plan of the first floor. The building map data may include position information of the elevator 530 and the stairway 520 which are features and landmarks of the first floor.

The electronic apparatus 100 may generate and display a navigation map 710 including outline based on landmark position information of the elevator 530 and the stairway 520 and the tracking data of users using the first indoor space among the building map data, as illustrated in FIG. 7. However, because floor plan information is not provided, the electronic apparatus 100 may not provide the map matching the generated navigation map 710.

Figure 8:
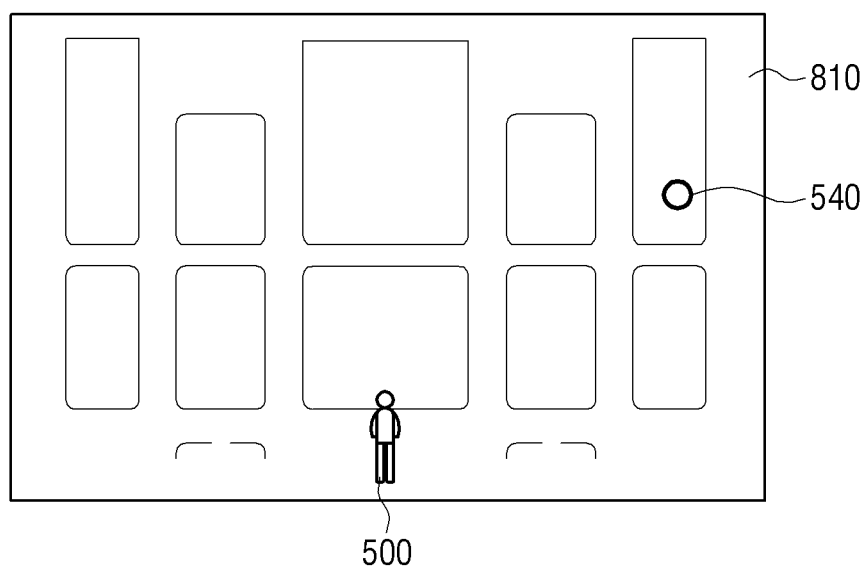

FIG. 8 is a diagram explaining a method for generating a navigation map when the electronic apparatus 100 does not receive building map data, as described in FIG. 4.

Referring to FIG. 8, when there is no received building map data in the map database of the electronic apparatus 100, the electronic apparatus 100 may download a map of an indoor space occupied by the electronic apparatus 100 through the wireless network. For example, the electronic apparatus 100 may obtain map information of a building by searching the building occupied by the electronic apparatus 100 from web pages such as internet through the wireless network.

The electronic apparatus 100 may generate and display a navigation map 810 by using the obtained building map information, as illustrated in FIG. 8. However, the electronic apparatus 100 may not provide the map matching on the generated navigation map. Further, the generated navigation map may not include tracking information of users using an indoor space.

The above are some of the embodiments for the present disclosure and the present disclosure is not limited thereto. For instance, the electronic apparatus 100 may generate and display a navigation map modified according to contextual data of the user 500. Contextual data may refer to data according to a type of the building map data of the floor occupied by the user 500, which is received by the electronic apparatus 100, and data according to whether or not building map data is received.

Further, the above embodiments may enhance accuracy of the map matching through motion information of the user 500 detected through various sensors including the motion sensor of the electronic apparatus 100. Further, BT electrical power may be saved by implementing that the electronic apparatus 100 may provide the map matching when motion of the user 500 is detected while not providing the map matching when motion of the user 500 is not detected for a designated time.

Figure 9:
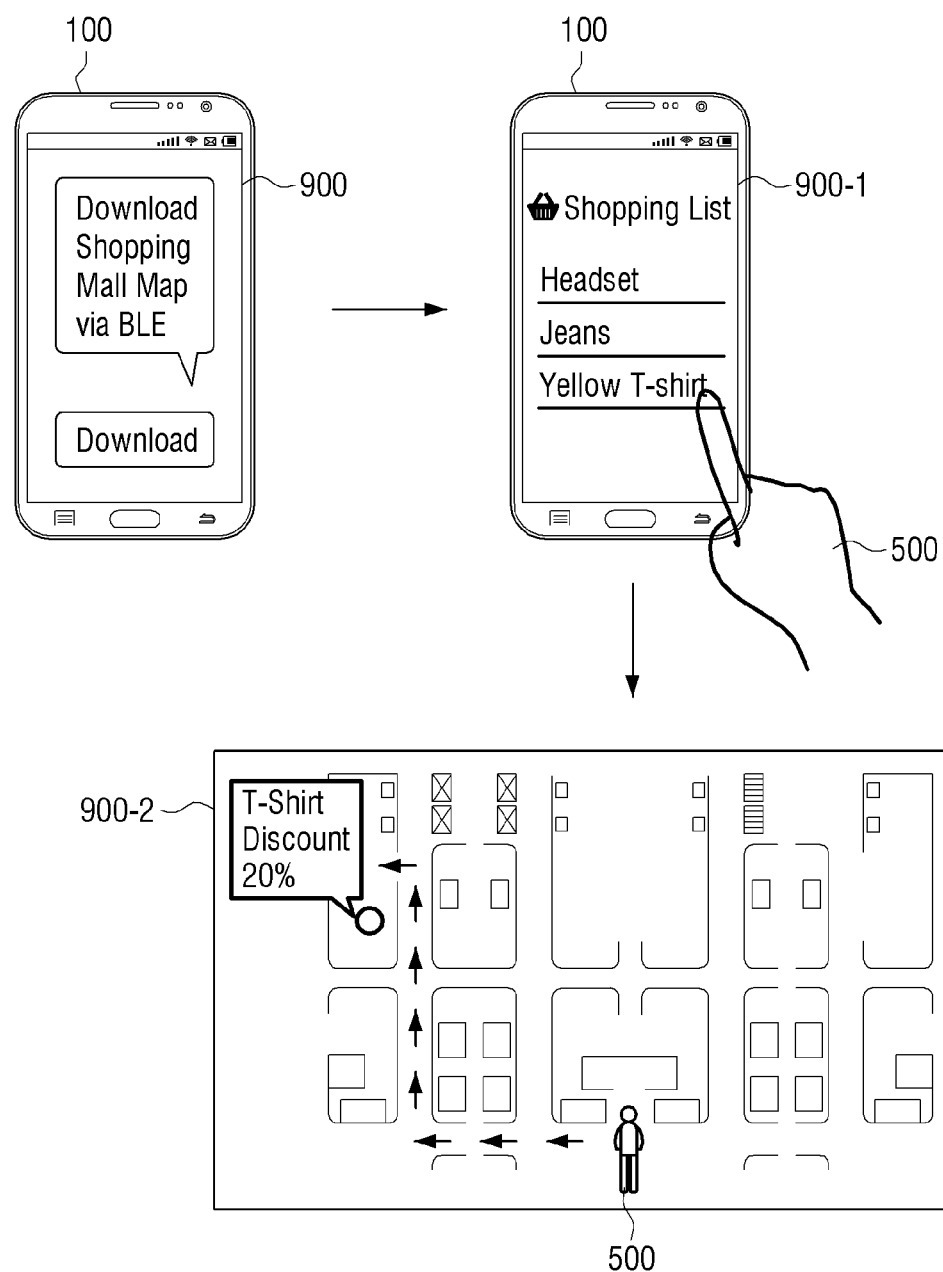
FIGS. 9, 10, and 11 are diagrams provided to explain various indoor navigation methods according to various embodiments of the present disclosure.
Figure 10:
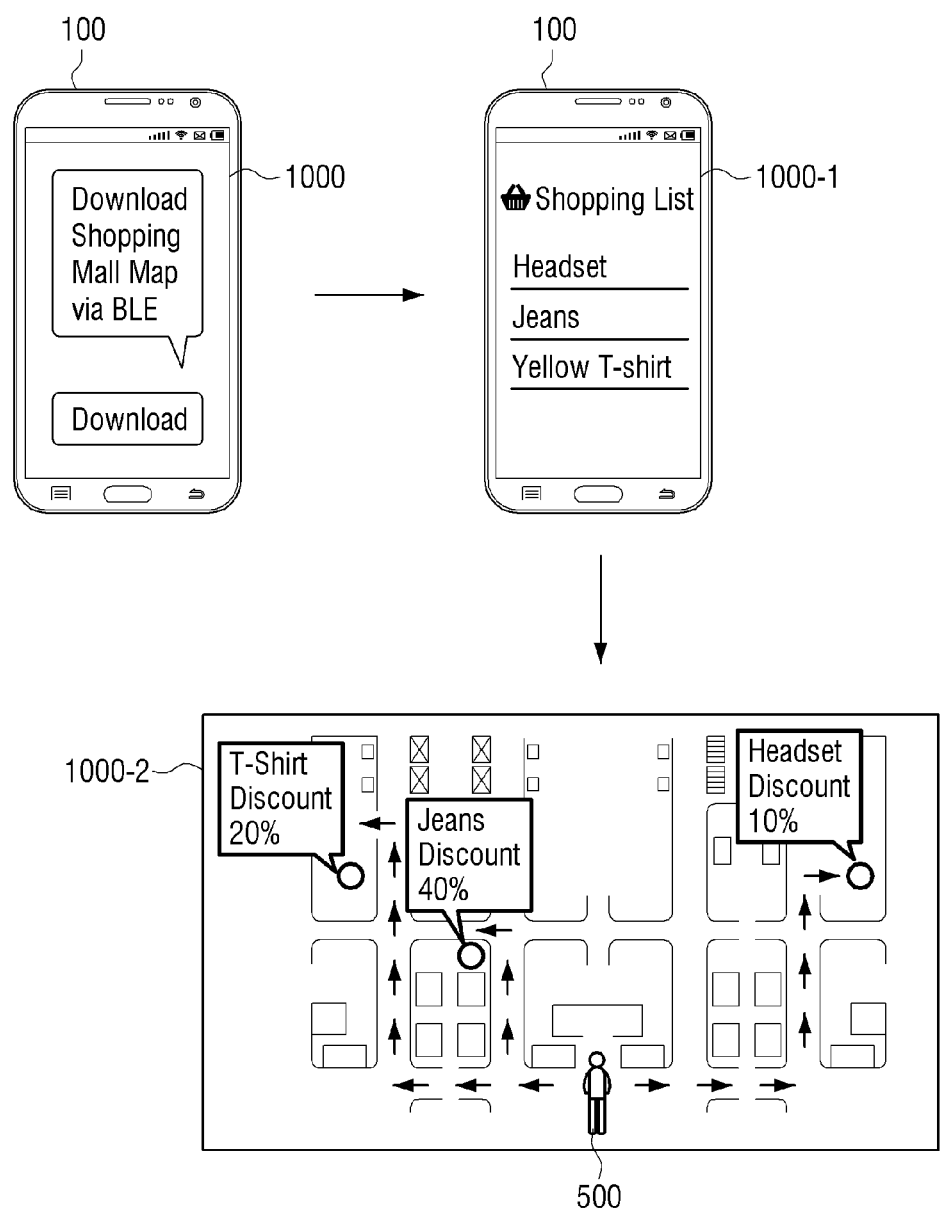
Figure 11:
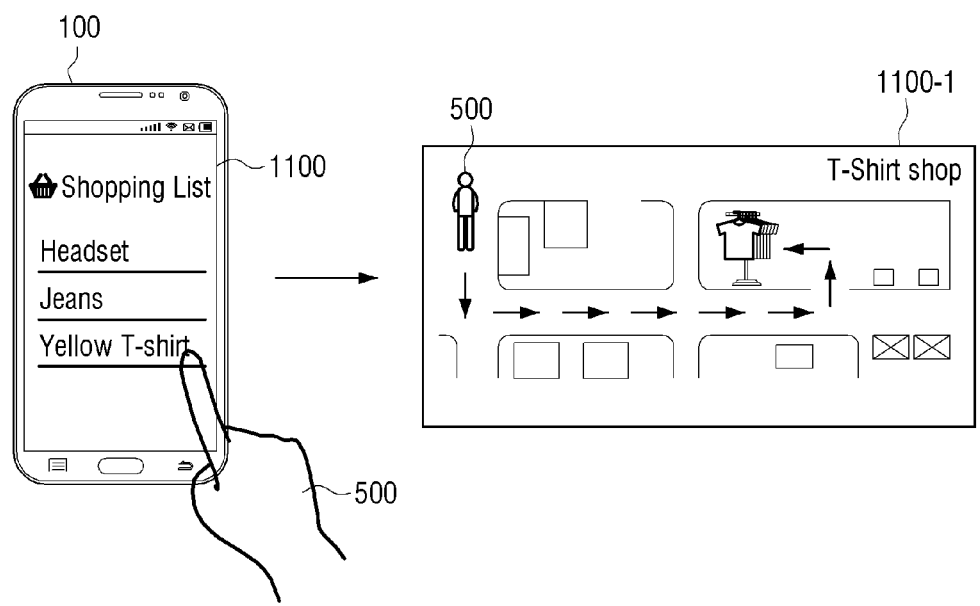

FIGS. 9 to 11 are diagrams provided to explain various indoor navigation methods according to various embodiments of the present disclosure. For example, FIGS. 9 to 11 are diagrams describing a method for generating and displaying a navigation map when the user 500 using the electronic apparatus 100 enters an indoor space such as shopping mall.

FIG. 9 is a diagram describing a navigation map guiding position of a shopping item at a shopping mall when the user 500 selects a desired shopping item at a shopping mall.

Referring to FIG. 9, when the electronic apparatus 100 enters an indoor space of a shopping mall, the display of the electronic apparatus 100 may display user interface (UI) 900 that can download an indoor map of the shopping mall through the near field wireless communication such as NFC, RFID, BT, and BLE.

The indoor map of the shopping mall may refer to a navigation map generated by receiving building map data from the shopping mall when the user enters the indoor space of the shopping mall and by using the received building map data and the methods for determining a distance and generating a navigation map described in the present disclosure.

The user 500 may select a desired shopping list by using shopping related information UI 900-1 provided from the shopping mall (and/or a store in the shopping mall).

When a desired shopping item (e.g., a yellow T-shirt) is selected, the electronic apparatus 100 may receive sale information and coupon information of the shopping item through the near field wireless communication from the shopping mall. When the user 500 using the electronic apparatus 100 enters within a preset distance to the selected shopping item, the shopping mall may automatically provide shopping information regarding the selected shopping item.

When the user 500 selects the desired shopping item as destination or does not select it as destination, the electronic apparatus 100 may provide and display the map matching from position of the user 500 to the shopping item (yellow T-shirt) on a navigation map 900-2.

FIG. 10 is a diagram describing a navigation map simultaneously informing positions of shopping items at a shopping mall when the user 500 lists desired shopping items at a shopping mall.

Referring to FIG. 10, the user 500 may be provided with a display of UI 1000, in the electronic device 100, that can download a map of a shopping mall within the shopping mall. The user 500 may list a desired shopping list based on shopping information of the shopping mall by using shopping related information UI 1000-1. The shopping mall may provide positions of the shopping list desired by the user and shopping information based on the shopping list information of the user 500. The electronic apparatus 100 may simultaneously display a position of the user 500, positions of items in the shopping list(s) and the shopping information on the navigation map 1000-2. The user may search a desired shopping item conveniently based on the mapping information and the shopping information displayed on the navigation map.

FIG. 11 is a diagram describing an indoor navigation map of a shop where a selected item is positioned when one item is selected on the shopping list described in FIG. 10.

The user 500 using the electronic apparatus 100 may select, from the UI 1100, the desired shopping item (yellow T-shirt) based on the shopping information of the shopping list(s) (coupon information, sale information and position information) provided by the shopping mall of FIG. 10. For convenience of explanation in the present disclosure, it is illustrated that a shopping item is selected on a touch screen of the electronic apparatus 100, but the present disclosure is not limited thereto. For example, the electronic apparatus 100 may be implemented so that a shopping item can be selected through voice recognition.

The electronic apparatus 100 may display a navigation map 1100-1 of a shop providing the selected shopping item, and may display the position of the selected shopping item (yellow T-shirt) on the navigation map 1100-1. The electronic apparatus 100 may provide the map matching from position of the user 500 to position of the selected shopping item, as illustrated in FIG. 11.

Figure 12:
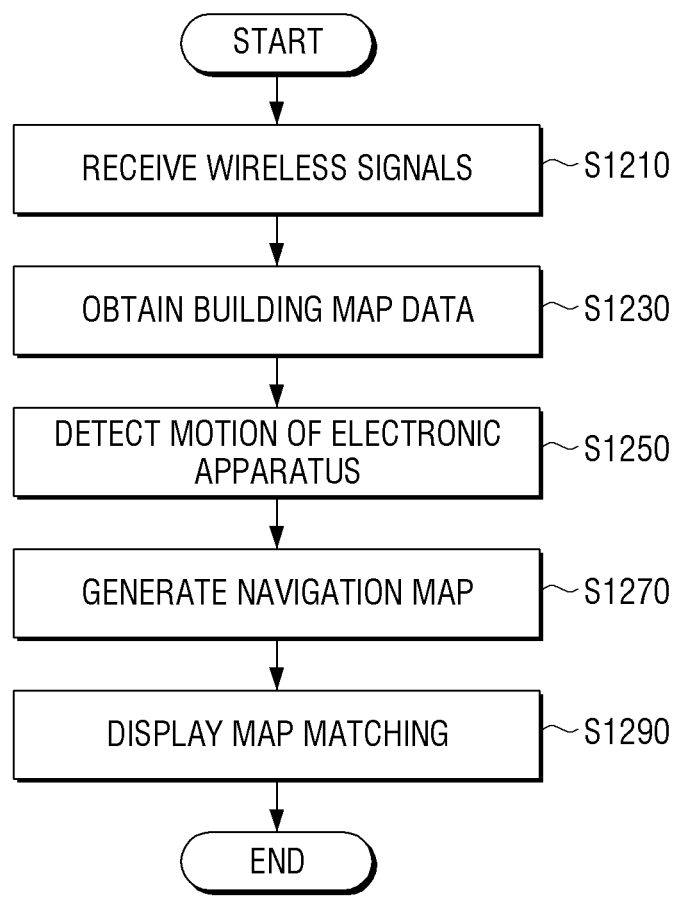
FIG. 12 is a flowchart provided to explain an indoor navigation method according to an embodiment of the present disclosure.

FIG. 12 is a flowchart describing an indoor navigation method according to an embodiment of the present disclosure.

At operation S1210, the electronic apparatus 100 may receive wireless signals when entering into an indoor space built with the near field wireless communication. The electronic apparatus 100 may include the near field wireless communication module such as BT and BLE. When a BT function of the electronic apparatus 100 is activated, the electronic apparatus 100 may determine a distance through RSSI of the received wireless signals. The method for measuring a distance with the electronic apparatus 100 that can reduce an error with a RSSI value is specifically explained in the above embodiments, which will not be further explained below.

At operation S1230, the electronic apparatus 100 may receive building map data of an indoor space occupied by the electronic apparatus 100 through the near field wireless communication. The building map data may be at least one among floor plans and partial floor plans of a building indoor space, tracking information data of users using the building indoor space and building landmarks and features, which are used in generating a navigation map in the present disclosure.

At operation S1250, the electronic apparatus 100 may detect motion of the electronic apparatus 100 through the sensors such as a motion sensor. The electronic apparatus 100 may generate more accurate navigation map and mapping information based on the detected motion information of the electronic apparatus 100 and various sensing information detected through the sensors.

At operation S1270, the electronic apparatus 100 may generate a navigation map by using the received building map data and the motion information of the electronic apparatus. The electronic apparatus 100 may generate an optimized navigation map per context (e.g., determine whether to include a floor plan or not) according to a data type of the building map data. The method for generating a navigation map is specifically described above, which will not be further explained below.

At operation S1290, the electronic apparatus 100 may display the map matching from the electronic apparatus 100 to a destination of the electronic apparatus 100 on the generated map.

Figure 13:
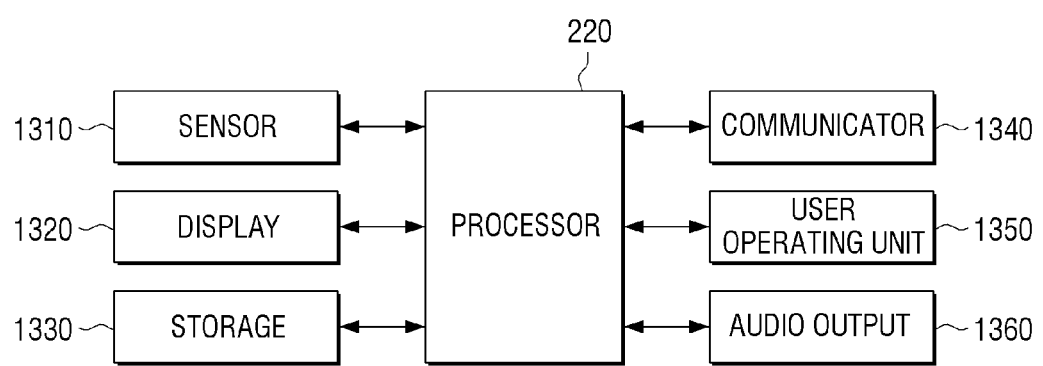
FIG. 13 is a block diagram illustrating constitution of an electronic apparatus in detail according to an embodiment of the present disclosure.

FIG. 13 is a block diagram specifically describing a constitution of the electronic apparatus according to an embodiment of the present disclosure.

Referring to FIG. 13, the electronic apparatus 100 may include the sensor 1310, the display 1320, a storage 1330 (e.g., a memory), the communicator 1340 (e.g., a transceiver), a user operating unit 1350 and the processor 220 (e.g., at least one processor).

According to an embodiment, the units illustrated in FIG. 13 may be partly removed or modified, and other new units may be added.

The sensor 1310 may perform a same function as the sensor 230 of FIG. 2, which will not be further explained below.

The display 1320 may display various UIs for implementation of the embodiments of the present disclosure.

The storage 1330 (e.g., memory) may store various modules to drive the electronic apparatus 100. For example, the storage 1330 may store software including base module, sensing module, communication module, presentation module, web browser module, and service module. In an example, the base module is basic module to process signals delivered from each hardware included in the electronic apparatus 100 and transmit the processed signals to upper layer module. The sensing module is module to collect information from the various sensors, and analyze and manage the collected information. The sensing module may include face recognition module, voice recognition module, motion recognition module, and NFC recognition module. The presentation module is module to generate a display screen, and may include multimedia module to reproduce and output multimedia contents, and UI rendering module to process UI and graphics. The communication module is a module to perform communication externally. The web browser module is a module to perform web browsing and access to a web server. The service module is a module to include various applications for providing various services.

Meanwhile, the storage 1330 may be implemented to include non-volatile memory, volatile memory, flash memory, hard disk drive (HDD), solid state drive (SSD), and the like. The storage 1330 may be accessed by the processor 220, in which reading/recording/revising/deleting/renewing of data may be performed by the processor 220. The term, memory, in the present disclosure may include the storage 1330, read only memory (ROM) and random access memory (RAM) within the processor 220 or a memory card (e.g., micro secure digital (SD) card, memory stick) attached to the electronic apparatus 100.

Further, the storage 1330 may store programs and data for generating a navigation map which will be displayed on a display region of the display 1320.

According to an embodiment, the storage 1330 may include database storing data provided to the electronic apparatus 100 through the near field wireless communication and navigation map information generated by the electronic apparatus 100. The database may store building map data information provided by a building indoor space occupied by the electronic apparatus 100. The database may store the building map information downloaded through the wireless network. The database may store a RSSI value and distance measurement algorithms of the electronic apparatus 100. The electronic apparatus 100 may provide information corresponding to the building indoor space based on the information stored in the database of the storage 1330 when the electronic apparatus 100 enters the above building.

As described above, the storage 1330 may include various program module; however, various program module may be partly removed or modified, or other new module may be added according to a type and a feature of the electronic apparatus 100.

The communicator 1340 is a unit to perform communication with various types of external devices according to various forms of communication methods. The communicator 1340 may include various communication chips such as Wi-Fi chip, BT chip (including BLE), NFC chip, wireless communication chip, and infrared (IR) chip. In an example, Wi-Fi chip, BT chip, NFC chip, and IR chip may perform communication respectively according to Wi-Fi method, BT method, NFC method, and IR method. NFC chip indicates a chip operating with NFC method using 13.56 MHz bandwidth among various RFID frequency bandwidths such as 135 kHz, 13.56 MHz, 433 MHz, 860-960 MHz, and 2.45 GHz. When Wi-Fi chip or BT chip is used, various connecting information such as service set identifier (SSID) and session key may be first trans-received, communication may be connected by using the connecting information, and various information may be trans-received. The wireless communication chip indicates a chip performing communication according to various communication standards such as Institute of Electrical and Electronics Engineers (IEEE), ZigBee, $3^{rd}$ generation (3G), 3G Partnership Project (3GPP), and long term evolution (LTE).

The user operating unit 1350 may receive various user commands to control the electronic apparatus 100. In an example, the user operating unit 1350 may be implemented to be a remote controller including a four-directional key. However, this is merely one of the embodiments of the present disclosure and is not limited thereto. For example, the user operating unit 1350 may be implemented to be various input devices such as pointing device provided with the motion sensor, keyboard, mouse, motion input provided with a camera, voice input provided with a microphone, and touch sensor.

The processor 220 may control general operation of the electronic apparatus 100 by using the various programs stored in the storage 1330. The processor 220 is described above in FIG. 2, and thus a description thereof will not be further provided below.

The methods described in the present disclosure may be recorded in a recording medium which may be read and implemented by a computer (e.g., at least one processor), which performs the above described functions.

The devices (e.g., electronic apparatus 100 or method (operations) thereof) according to the various embodiments may be performed by, for example, at least one computer (e.g., processor 220) which implements instructions included in at least one program among programs maintained by computer readable recording storage media.

When the instructions are implemented by a computer (e.g., processor 220), at least one computer may perform corresponding functions to the commands. In an example, the computer readable recording storage media may be, for example, the memory.

The programs may be included, for example, in the computer readable recording storage media such as hard disk, floppy disk, magnetic media (e.g., magnetic tape), optical media (e.g., compact disc read only memory (CD-ROM), digital versatile disc (DVD), magneto optical media (e.g., floptical disk)), hardware device (e.g., read only memory (ROM), random access memory (RAM), or flash memory), and the like. In this case, the computer readable recording storage media may be included in a part of the constitution of the electronic apparatus 100 generally, attached through a port of the electronic apparatus 100, or included in an external device (e.g., cloud, server or another electronic apparatus) positioned externally from the electronic apparatus 100. Further, programs may be distributed and stored in a plurality of the computer readable recording storage media, and in this case, at least a part of a plurality of the computer readable recording storage media may be positioned on an external device of the electronic apparatus 100.

Instructions may include high class language codes that can be run by a computer with the interpreter as well as mechanical codes created by the compiler. The above hardware devices may be constituted to operate as more than one software module in order to perform the operations of the various embodiments, and vice versa.

Meanwhile, the methods of the electronic apparatus according to the above various embodiments may be implemented to be programs and provided to the electronic apparatus. Further, non-transitory computer readable recording medium storing the programs performing the above methods may be provided to the electronic apparatus.

The non-transitory computer readable recording medium indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disk, universal serial bus (USB), memory card, or ROM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus for indoor positioning navigation, the electronic apparatus comprising:
    a transceiver configured to receive near field wireless signals;
    a sensor configured to detect motion of the electronic apparatus;
    a display; and
    at least one processor configured to:
        determine if building map data of a building is received through the transceiver,
        generate a navigation map based on a type of the received building map data in response to the building map data being received, and
        control the display to display a map matching a position of the electronic apparatus to a position of a destination of the electronic apparatus with the generated navigation map, by using at least one among intensity information of the wireless signals received through the transceiver and motion information of the electronic apparatus detected through the sensor,
    wherein the generating of the navigation map comprises generating a first navigation map in response to a first type of building map data being received or generating a second navigation map in response to a second type of building map data being received, and
    wherein the building map data comprises building features or building landmarks such as at least one of corridors, stairways, elevators, respective floor plans of floors of a building, respective partial floor plans of floors of a building, and tracking data of users using a building indoor space.

2. The electronic apparatus of claim 1, wherein the at least one processor is further configured to:
    generate the navigation map by using a floor plan of a floor where the electronic apparatus and the destination of the electronic apparatus are positioned, when the received building map data comprises the floor plan of the floor where the electronic apparatus and the destination of the electronic apparatus are positioned, and
    generate the navigation map by generating a floor plan of a floor where at least one of the electronic apparatus and the destination of the electronic apparatus is positioned based on a partial floor plan of the floor where the at least one of the electronic apparatus and the destination of the electronic apparatus and a floor plan of an adjacent floor to the floor corresponding to the partial floor plan, when the received building map data comprises the partial floor plan and the floor plan of the adjacent floor to the floor corresponding to the partial floor plan.

3. The electronic apparatus of claim 2, wherein the at least one processor is further configured to generate the navigation map by generating a floor plan of a floor where at least one of the electronic apparatus or the destination of the electronic apparatus is positioned based on a partial floor plan of the floor where the at least one of the electronic apparatus and the destination of the electronic apparatus and building map data excluding floor plan information, when the received building map data comprises the partial floor plan and does not include a floor plan of an adjacent floor to the floor corresponding to the partial floor plan.

4. The electronic apparatus of claim 1, wherein the at least one processor is further configured to generate the navigation map of a floor where at least one of the electronic apparatus and the destination of the electronic apparatus is positioned based on tracking information of users in the building, when the received building map data comprises the tracking information of users in the building and does not comprise a floor plan of the floor where the at least one of the electronic apparatus and the destination of the electronic apparatus is positioned.

5. The electronic apparatus of claim 1, wherein the at least one processor is further configured to generate the navigation map by using moving information data of the user detected through the sensor and position information of wireless signal sources transmitting the received wireless signals, when the building map data is not received.

6. The electronic apparatus of claim 1,
    wherein the transceiver comprises a wireless network interface, and
    wherein, when the building map data is not received, the at least one processor is further configured to:
        obtain a building map of the building through the wireless network interface, and
        generate the navigation map free of a tracking outline information of the building based on the obtained building map.

7. The electronic apparatus of claim 1,
    wherein the sensor comprises an ultrasound sensor, and
    wherein, when ultrasound data is available for use in the indoor space, the processor is further configured to determine the position of the electronic apparatus on the navigation map by determining a distance between the electronic apparatus and the wireless signal sources in the indoor space based on a response time of the ultrasound data detected through the ultrasound sensor.

8. The electronic apparatus of claim 1,
    wherein the transceiver comprises a Bluetooth low energy (BLE) wireless communication module, and
    wherein, when ultrasound data is not available for use in the indoor space, the at least one processor is further configured to determine the position of the electronic apparatus on the navigation map by determining a distance between the electronic apparatus and the wireless signal sources based on a received signal strength indication (RSSI) value of the BLE wireless signals received from the wireless signal sources in the indoor space through the BLE wireless communication module.

9. The electronic apparatus of claim 8, wherein the at least one processor is further configured to:
- determine one of a plurality of distance measurement algorithms to measure a distance between the electronic apparatus and the wireless signal sources according to the RSSI value, and
- determine a distance between the electronic apparatus and the wireless signal sources from the received RSSI value by using the determined distance measurement algorithm.

10. A method for navigating indoor position of an electronic apparatus, the method comprising:
- receiving near field wireless signals;
- determining if building map data of a building is received;
- detecting motion of the electronic apparatus;
- in response to the building map data being received, generating a navigation map based on a type of the received building map data; and
- displaying a map matching a position of the electronic apparatus to a position of a destination of the electronic apparatus with the generated navigation map, by using at least one among intensity information of the received wireless signals and motion information of the detected motion of the electronic apparatus,
- wherein the generating of the navigation map comprises generating a first navigation map in response to a first type of building map data being received or generating a second navigation map in response to a second type of building map data being received, and
- wherein the building map data comprises building features or building landmark such as at least one of corridors, stairways, elevators, respective floor plans of floors of a building, respective partial floor plans of floors of a building, and tracking data of users using a building indoor space.

11. The method of claim 10, wherein the generating of the navigation map comprises generating the navigation map by using a floor plan of a floor where the electronic apparatus and the destination of the electronic apparatus are positioned, when the received building map data comprises the floor plan of the floor where the electronic apparatus and the destination of the electronic apparatus.

12. The method of claim 11, wherein the generating of the navigation map further comprises generating the navigation map by generating a floor plan of a floor where at least one of the electronic apparatus and the destination of the electronic apparatus is positioned based on a partial floor plan of the floor where the at least one of the electronic apparatus and the destination of the electronic apparatus and a floor plan of an adjacent floor to the floor corresponding to the partial floor plan, when the received building map data comprises the partial floor plan and the floor plan of the adjacent floor to the floor corresponding to the partial floor plan.

13. The method of claim 12, wherein the generating of the navigation map further comprises generating the navigation map by generating a floor plan of a floor where at least one of the electronic apparatus and the destination of the electronic apparatus is positioned based on a partial floor plan of the floor where the at least one of the electronic apparatus and the destination of the electronic apparatus and building map data excluding floor plan information, when the received building map data comprises the partial floor plan and does not include a floor plan of an adjacent floor to the floor corresponding to the partial floor plan.

14. The method of claim 10, wherein the generating of the navigation map comprises generating the navigation map of a floor where at least one of the electronic apparatus and the destination of the electronic apparatus is positioned based on tracking information of users in the building, when the received building map data comprises the tracking information of users in the building and does not comprise a floor plan of the floor where the at least one of the electronic apparatus and the destination of the electronic apparatus is positioned.

15. The method of claim 10, wherein the generating of the navigation map comprises generating the navigation map by using the detected moving information data of a user and the received position information of the wireless signal sources transmitting the wireless signals, when the building map data is not received.

16. The method of claim 10, wherein the receiving of the near field wireless signals comprises receiving wireless communication data through a wireless network interface, and the generating of the navigation map comprises:
- obtaining a building map of the building through the wireless network interface when the building map data is not received, and
- generating the navigation map free of a tracking outline information of the building based on the obtained building map.

17. The method of claim 10, wherein the receiving of the wireless signals comprises:
- when ultrasound data is available for use in the wireless signals, detecting a reflected wave of the emitted ultrasound wave with an ultrasound sensor,
- calculating a distance between the electronic apparatus and the wireless signal sources of the indoor space based on a response time of the ultrasound data, and
- determining the position of the electronic apparatus in the navigation map based on the calculated distance.

18. The method of claim 10, wherein the receiving of the wireless signals comprises:
- when ultrasound data is not available for use in the wireless signals, determining the position of the electronic apparatus in the navigation map by determining a distance between the electronic apparatus and the wireless signal sources based on a received signal strength indication (RSSI) value of the received Bluetooth low energy (BLE) wireless signals from the wireless signal sources of the indoor space.

19. A computer program product comprising a non-transitory computer readable storage medium having a computer readable program stored therein, wherein the computer readable program, when executed on a computing device of an electronic apparatus, causes the computing device to:
- determine if building map data of a building is received;
- generate a navigation map based on a type of the received building map data in response to the building map data being received; and
- display a map matching a position of the electronic apparatus to a position of a destination of the electronic apparatus with the generated navigation map, by using at least one among intensity information of the wireless signals received and motion information of the electronic apparatus detected through a sensor of the electronic apparatus,
- wherein the generating of the navigation map comprises generating a first navigation map in response to a first type of building map data being received or generating a second navigation map in response to a second type of building map data being received, and wherein the building map data comprises building features or building landmark such as at least one of corridors, stairways, elevators, respective floor plans of floors of a building, respective partial floor plans of floors of a building, and tracking data of users using a building indoor space.

\* \* \* \* \*